(12) United States Patent
Caspall

(10) Patent No.: US 11,726,196 B2
(45) Date of Patent: Aug. 15, 2023

(54) SONAR SYSTEM WITH INCREASED TRANSVERSE BEAM WIDTH

(71) Applicant: NAVICO, INC., Tulsa, OK (US)

(72) Inventor: Jayme Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 277 days.

(21) Appl. No.: 17/087,757

(22) Filed: Nov. 3, 2020

(65) Prior Publication Data

US 2021/0132204 A1 May 6, 2021

Related U.S. Application Data

(60) Provisional application No. 62/930,693, filed on Nov. 5, 2019.

(51) Int. Cl.
*G01S 7/521* (2006.01)
*G01S 15/89* (2006.01)
*G01S 15/96* (2006.01)

(52) U.S. Cl.
CPC .......... *G01S 7/521* (2013.01); *G01S 15/8902* (2013.01); *G01S 15/96* (2013.01)

(58) Field of Classification Search
CPC ...... G10K 11/28; G10K 11/30; G10K 11/343; G10K 11/205; G10K 11/346; G01S 15/89; G01S 15/8902; G01S 15/86; G01S 7/521; G01S 15/96
See application file for complete search history.

(56) References Cited

U.S. PATENT DOCUMENTS

| | | | |
|---|---|---|---|
| 2006/0042389 A1* | 3/2006 | Sato ....................... | A61B 8/145 600/447 |
| 2007/0159922 A1* | 7/2007 | Zimmerman ........... | G01S 15/86 367/103 |
| 2011/0013485 A1* | 1/2011 | Maguire ............. | G01S 15/8902 367/88 |

(Continued)

OTHER PUBLICATIONS

"PANOPTIX™ All-Seeing Sonar;" retrieved Dec. 1, 2020 from https://explore.garmin.com/en-US/panoptix/.

(Continued)

*Primary Examiner* — Daniel L Murphy
*Assistant Examiner* — Amie M Ndure
(74) *Attorney, Agent, or Firm* — Nelson Mullins Riley & Scarborough LLP

(57) ABSTRACT

Sonar systems and related methods are provided. A sonar system includes a transducer array having a transverse axis and a longitudinal axis disposed perpendicularly thereto. A processor is operative to associate signals with a plurality of transducers in the transducer array so as to form a first acoustic beam, which propagates in a beam first direction and has a first beam width in a first transverse plane. The first transverse plane extends along the beam first direction and contains the transverse axis of the transducer array. A beam spreading device having a curved surface is positioned relative to the transducer array such that the first acoustic beam impinges on the curved surface. Following impingement on the curved surface, the first acoustic beam propagates in a beam second direction and has a second beam width in a second transverse plane. The second beam width is greater than the first beam width.

20 Claims, 9 Drawing Sheets

(56) References Cited

U.S. PATENT DOCUMENTS

| | | | | |
|---|---|---|---|---|
| 2012/0106300 A1* | 5/2012 | Maguire | ................ | G01S 15/89 |
| | | | | 367/153 |
| 2013/0258811 A1* | 10/2013 | Guigne | .............. | G01S 15/8904 |
| | | | | 367/88 |
| 2020/0256967 A1* | 8/2020 | Wigh | ..................... | G01S 7/521 |

OTHER PUBLICATIONS

"BlueView DP900 90 Fish Measurement;" YouTube; Apr. 7, 2009; retrieved Dec. 1, 2020 from https://www.youtube.com/watch?v=qQyeA14b17Q.

Aris Explorer; *Sound Metrics*; retrieved Dec. 1, 2020 from http://www.soundmetrics.com/.

\* cited by examiner

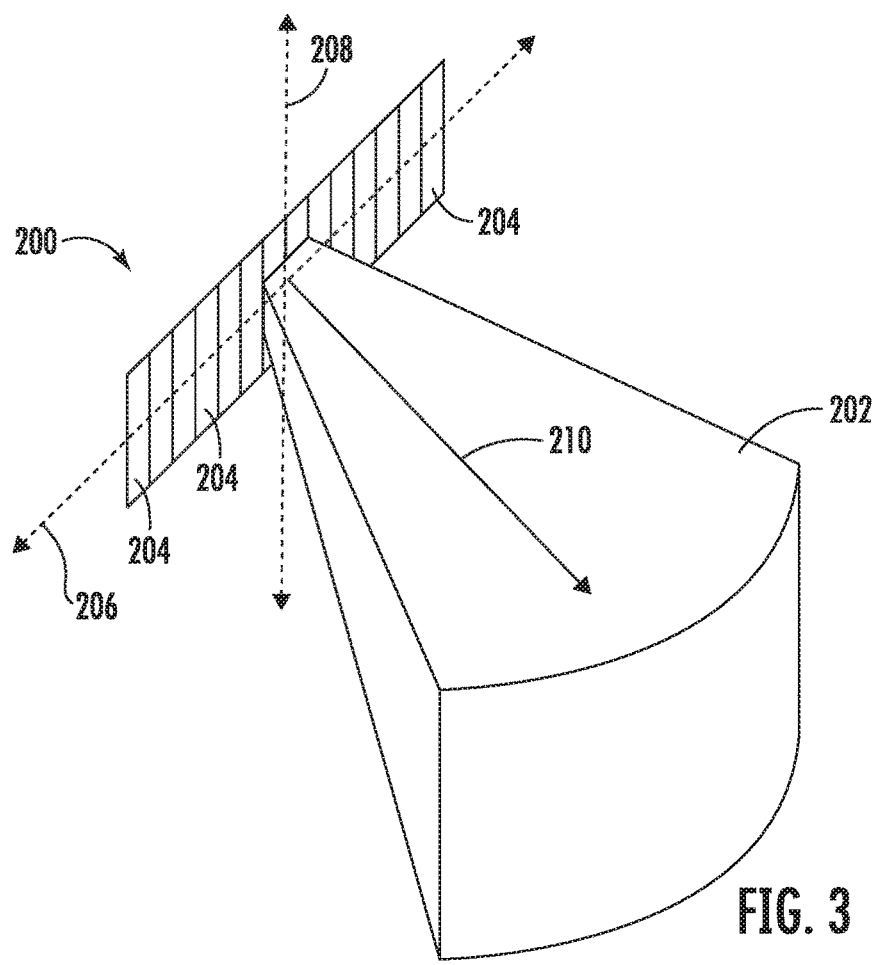
FIG. 3
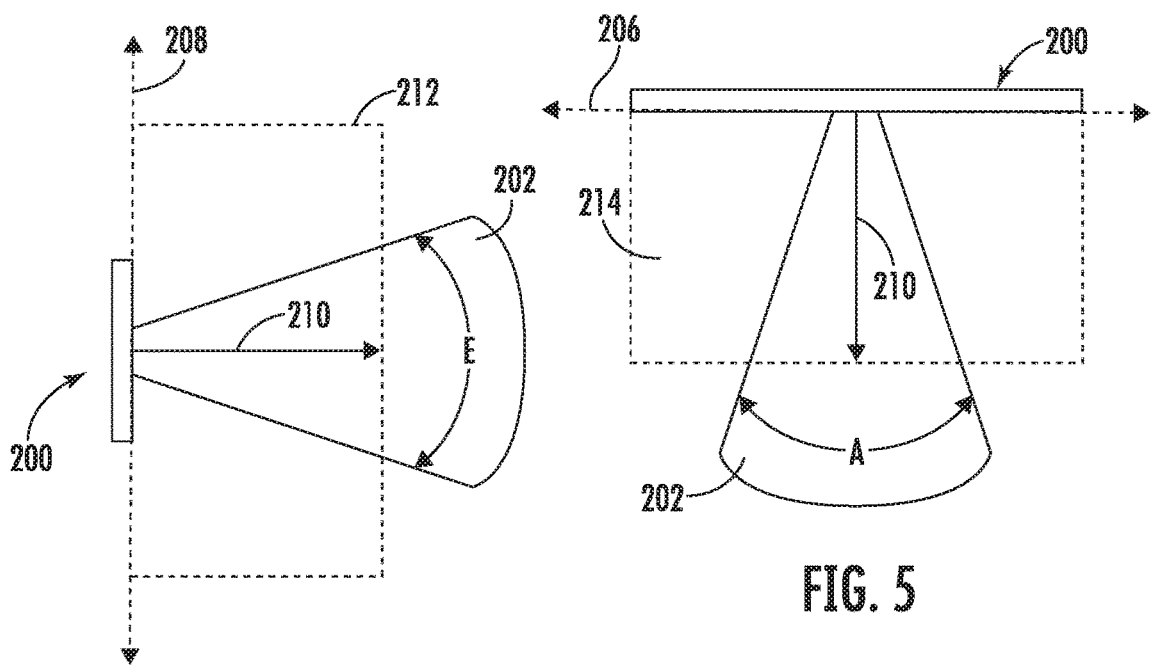
FIG. 4
FIG. 5

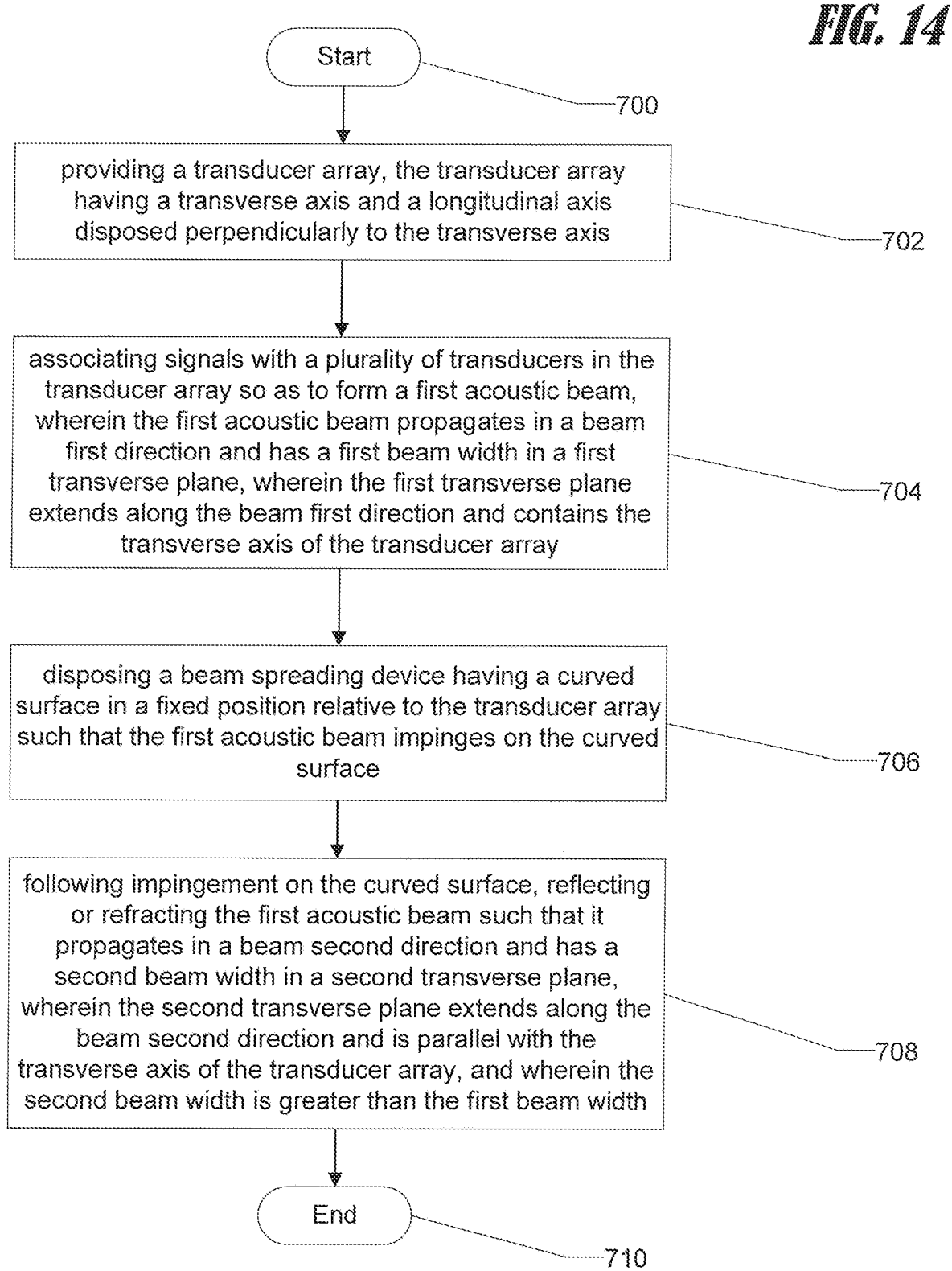

SONAR SYSTEM WITH INCREASED TRANSVERSE BEAM WIDTH

CROSS-REFERENCE TO RELATED APPLICATION(S)

This application claims priority to U.S. Provisional Application No. 62/930,693, filed Nov. 5, 2019, entitled "Sonar System with Increased Transverse Beam Width"; which is incorporated herein by reference in its entirety.

FIELD OF THE INVENTION

Embodiments of the present invention relate generally to the operation of sonar transducer arrays, and more particularly, to methods and apparatus for increasing the transverse field angular coverage range in sonar transducer arrays using one or more beam spreading devices.

BACKGROUND

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Sonar transducer elements, or simply transducers, produce sound or vibrations at a particular frequency that is transmitted into and through the water and also detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer (e.g., a cylindrical shaped crystal with a circular face) typically creates a conical shaped beam with the apex of the cone being located at the source. Linear (e.g., rectangular) transducer elements often generate a somewhat planar, fan-shaped beam pattern. Regardless, any reflected sound then returns to the transducer to form a return signal that may be interpreted as a surface of an object. Historically, these types of sonar systems primarily analyzed the column of water beneath a watercraft. However, "sidescan" sonar systems, wherein one or more sonar transducers are used to analyze water to either side of their vessel, also are known.

Various known sonar systems employ electronic beamforming methods to form and steer acoustic beams. Conventionally, beamforming and steering has involved the use of phased or time-delayed acoustic pulses applied to an array of transducer elements so that the acoustic waves that are generated at each transducer element superpose to create a resulting beam. The resulting beam has a particular direction relative to an axis perpendicular to the emitting surfaces of the transducer elements.

However, another type of electronic beamforming is known as "frequency steering" or "frequency division." In frequency division transmit beamforming, a sonar system includes an array of transducers (sometimes referred to as a "frequency-steered array") wherein each transducer element in the transducer array is driven by a signal which leads or lags its neighboring transducer element by a fixed phase shift, and the direction of the resulting acoustic beam is determined by the frequency of the signals. Based on the known relationship between phase, frequency, and beam direction, the beamforming system can steer the acoustic beam by varying the frequency of the signals. Frequency division receive beamforming operates in a similar fashion, in that the received signal from each element in the array is phase shifted so it leads or lags its nearest neighbor by a fixed phase shift. Additionally, the beamforming system can generate multiple simultaneous transmitting and/or receiving beams by transmitting a wide bandwidth signal and receiving the sonar returns through a spectrum analyzer. Each frequency bin of the spectrum analyzer corresponds to a beam pointing in its own particular direction.

BRIEF SUMMARY

Some frequency-steered sonar arrays may generate a somewhat planar fan-shaped acoustic beam. When such frequency-steered sonar arrays are deployed on a vessel for the purpose of generating a live sidescan image, the beam is relatively narrow in beam width in a transverse direction, e.g., a direction perpendicular to the centerlines of each transducer in the array, and is relatively wide in beam width in a longitudinal direction, e.g., a direction parallel to the centerlines of each transducer in the array. (Depending on the orientation of the transducer array, the transverse direction may be the direction parallel to a keel of the vessel, and the longitudinal direction may be the direction perpendicular to the keel of the vessel, but other implementations occur in practice.) Some such frequency-steered sonar arrays are not suitable for providing a live sidescan sector image because the beam width in the transverse direction is not wide enough to provide sufficient context from which an operator may identify structures, objects, and the lake or sea bed from the surface. For instance, commercially available frequency-steered sonar arrays have a beam width in the transverse direction that typically does not exceed about twenty (20) degrees and often is only about twelve (12) to fourteen (14) degrees.

For a given acoustic beam, the beam width in the transverse direction depends on the geometry of the transducer elements, and the beam width can be increased by decreasing the length or height of the transducer elements along the transverse direction. However, doing so causes a reduction in the radiated on-axis intensity in the longitudinal direction. In other words, there is a tradeoff between increasing the transverse direction beam width of an acoustic beam and reducing both the total radiated power in the beam and the total intensity of the beam due to geometric spreading. Accordingly, if the transducer element is reduced in length or height in the transverse direction to generate a higher transverse beam width, the result is less acoustic signal energy at the point of the interrogated object. Likewise, due to reciprocity, there is less total force on the receiving transducer elements and less signal energy for a given source located in the field of view of the array.

It is possible to provide a cylindrical array wherein transducer elements are distributed in two directions on a cylindrical surface (or multiple line arrays distributed azimuthally around the axis of a cylinder) such that the multiple acoustic beams will be deployed and, together, they will define an increased transverse field of view. However, there are a number of drawbacks with this approach. Among other things, it is more expensive to fabricate arrays on a cylindrical contour. Moreover, the radiating areas of the arrays are very small, and the total radiated power will be small.

In contrast, embodiments of the present invention provide sonar systems and methods for operating sonar systems wherein the transverse field angular coverage range in transducer arrays (including frequency-steered sonar transducer arrays) is increased. In various embodiments, the length or height of the transducer elements need not be decreased, and thus a corresponding reduction in radiated power or intensity is not observed. In this regard, some example embodiments comprise a sonar system including a transducer array and at least one beam spreading device that may be mounted in a fixed position relative to the transducer array. In some embodiments, the transducer array may be operative to generate "steerable" acoustic beams. In some embodiments, the transducer array may be a frequency-steered array. The beam spreading device may have at least one beam spreading surface, which may be non-flat or non-planar, and acoustic beams generated at the transducer array may impinge upon the at least one beam spreading surface. In some embodiments, acoustic beams (or portions thereof) generated at the transducer array may have a first direction, and the beams (or beam portions) may have a second, different direction after impingement upon the at least one beam spreading surface. For example, in various embodiments, the at least one beam spreading surface may be convex and/or concave along or within various portions thereof, and acoustic beams may be reflected off of and or refracted by the beam spreading device. As described in greater detail herein, in various embodiments, the beam spreading surface may be shaped such that, after an acoustic beam has impinged thereupon, the beam's transverse beam width is increased. In various embodiments, the beam or beams transmitted from the transducer array may have a first transverse beam width, whereas, after coming into contact with the beam spreading device, the beam or beams may have a second transverse beam width that is greater than the first transverse beam width. In various embodiments, the second transverse beam width may be greater than about twenty-eight (28) degrees and may be ninety (90) degrees or greater in other embodiments. Various embodiments may be more cost effective than production of a cylindrical transducer array, in that a standard transducer array fabrication process may be used and a passive element may be used to expand the transverse field of view of an acoustic beam.

In an example embodiment, a sonar system for a water craft is provided. The sonar system comprises a transducer array that defines a transverse axis and a longitudinal axis. The longitudinal axis extends orthogonal to the transverse axis. The transducer array is mountable to the water craft. The sonar system further comprises a sonar signal processor in electronic communication with the transducer array. The sonar signal processor is operative to associate signals with a plurality of transducers in the transducer array to form at least one acoustic beam in a beam direction. The at least one acoustic beam defines a transverse beam width in a transverse direction corresponding to the transverse axis and a longitudinal beam width in a longitudinal direction corresponding to the longitudinal axis. The sonar system further includes a beam spreading device mounted in a fixed position relative to the transducer array. The beam spreading device includes at least one non-flat beam spreading surface positioned along the beam direction such that, when the at least one acoustic beam is emitted, the at least one acoustic beam impinges upon the at least one non-flat beam spreading surface and causes spreading so as to increase the transverse beam width.

In some embodiments, the transducer array is a linear transducer array.

In some embodiments, the sonar system further includes a housing in which the transducer array and the beam spreading device are disposed.

In some embodiments, the non-flat beam spreading surface is convex.

In some embodiments, the non-flat beam spreading surface is concave.

In some embodiments, the beam spreading device is formed of a foam material.

In some embodiments, the beam direction is aimed at an exterior surface of a hull of the water craft such that the at least one acoustic beam reflects off the non-flat beam spreading surface away from the exterior surface of the hull of the water craft.

In some embodiments, the signals associated with the plurality of transducers are phase-shifted signals. In some embodiments, varying the frequency of the signals associated with the plurality of transducers permits steering of the at least one acoustic beam.

In another example embodiment, a method of using an underwater sonar system is provided. The method comprises providing a transducer array that has a transverse axis and a longitudinal axis disposed perpendicularly to the transverse axis. The method further comprises associating signals with a plurality of transducers in the transducer array so as to form a first acoustic beam. The first acoustic beam propagates in a beam first direction and has a first beam width in a first transverse plane. The first transverse plane extends along the beam first direction and contains the transverse axis of the transducer array. The method further includes disposing a beam spreading device having a curved surface in a fixed position relative to the transducer array such that the first acoustic beam impinges on the curved surface. Following impingement on the curved surface, the first acoustic beam propagates in a beam second direction and has a second beam width in a second transverse plane. The second transverse plane extends along the beam second direction and is parallel with the transverse axis of the transducer array. The second beam width is greater than the first beam width.

In some embodiments, the method further comprises receiving, at a sonar signal processor, signals from the transducer array that result from a received acoustic beam. In some embodiments, the method further comprises generating, at the sonar signal processor, sonar image data based on the received signals, wherein the sonar image data, when presented on a display, forms a sonar image representing an underwater environment.

In yet another example embodiment, a sonar system for a water craft is provided. The sonar system comprises a transducer array that has a transverse axis and a longitudinal axis disposed perpendicularly to the transverse axis. The sonar system further includes a sonar signal processor in electronic communication with the transducer array. The sonar signal processor is operative to associate signals with a plurality of transducers in the transducer array so as to form a first acoustic beam. The first acoustic beam propagates in a beam first direction and has a first beam width in a first transverse plane. The first transverse plane extends along the beam first direction and contains the transverse axis of the transducer array. The sonar system further includes a beam spreading device having a curved surface.

The beam spreading device is positioned relative to the transducer array such that the first acoustic beam impinges on the curved surface. The curved surface is shaped and oriented such that, following impingement on the curved surface, the first acoustic beam propagates in a beam second direction and has a second beam width in a second transverse plane. The second transverse plane extends along the beam second direction and is parallel with the transverse axis of the transducer array. The second beam width is greater than the first beam width.

In some embodiments, the curved surface defines a cross-section that is convex with respect to the transducer array.

In some embodiments, the second beam width is greater than about twenty-eight (28) degrees in the second transverse plane.

In some embodiments, the curved surface reflects the first acoustic beam.

In some embodiments, the beam spreading device refracts the first acoustic beam.

In some embodiments, the transducer array is a frequency-steered array.

In some embodiments, the curved surface has a radius of curvature, and the radius of curvature lies on a plane that is parallel with the transverse axis.

In some embodiments, the beam second direction is different than the beam first direction.

Methods of manufacturing various example embodiments described herein are also contemplated.

BRIEF DESCRIPTION OF THE DRAWINGS

Figure 1:
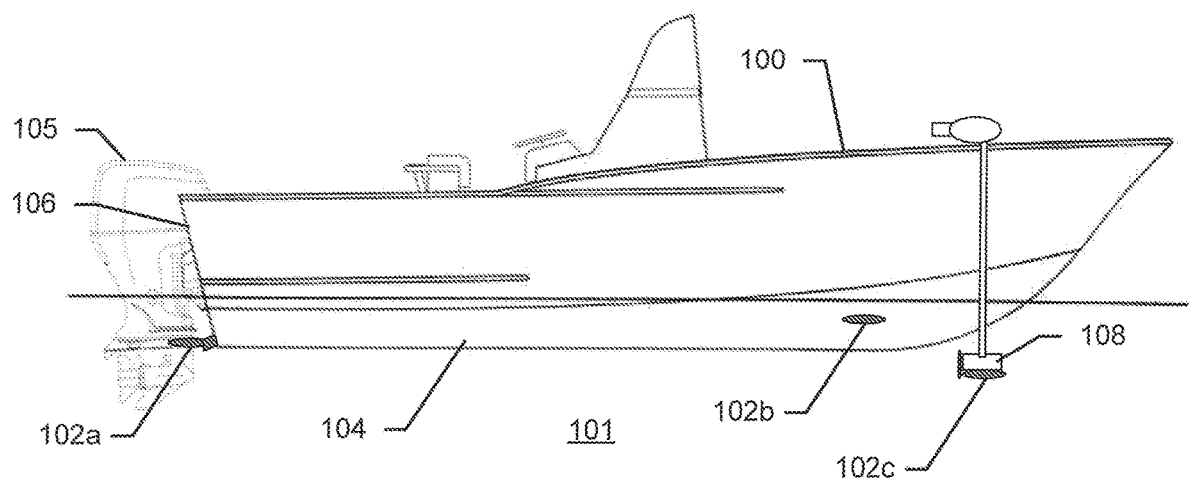
Figure 2:
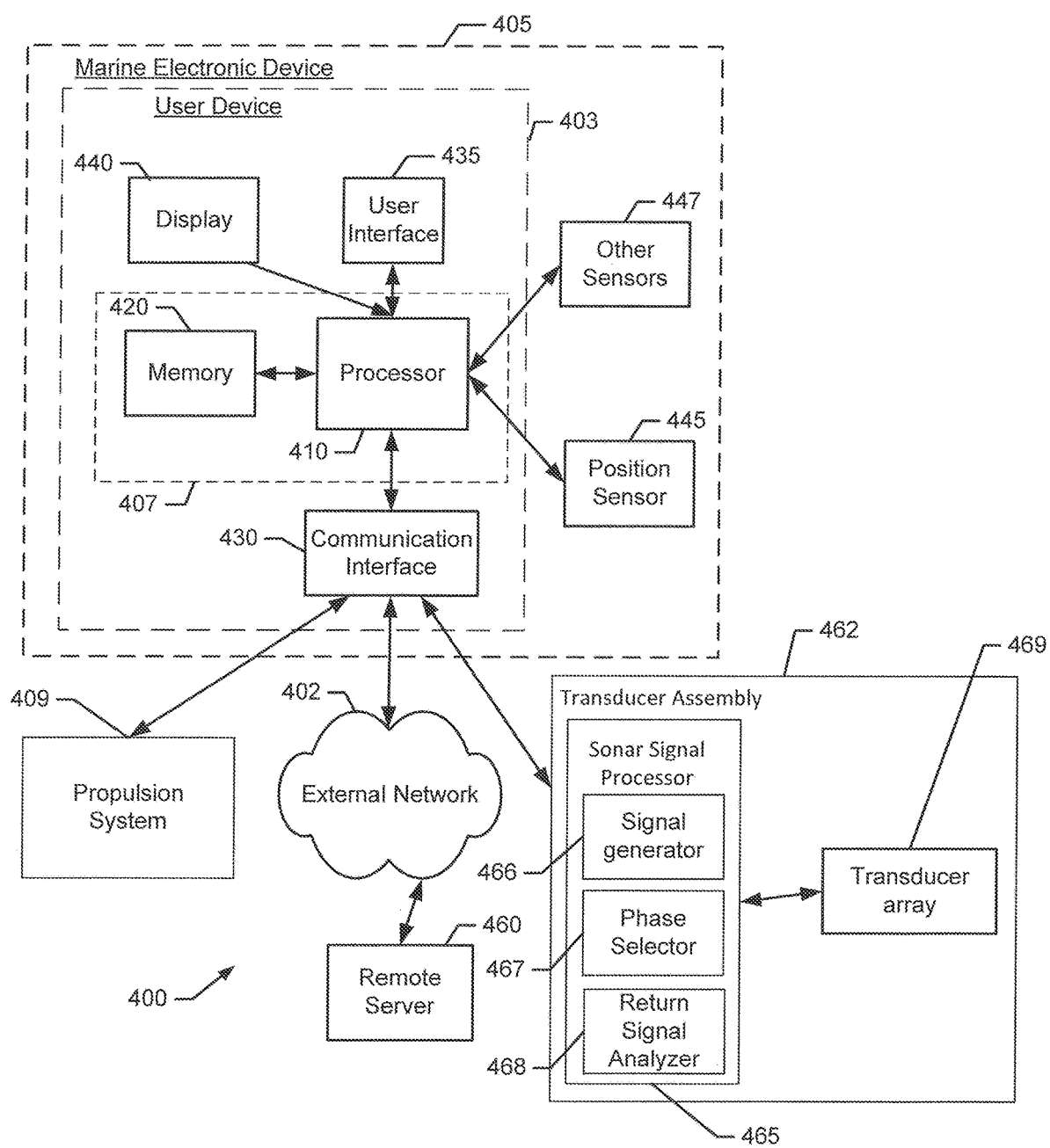
Figure 6A:
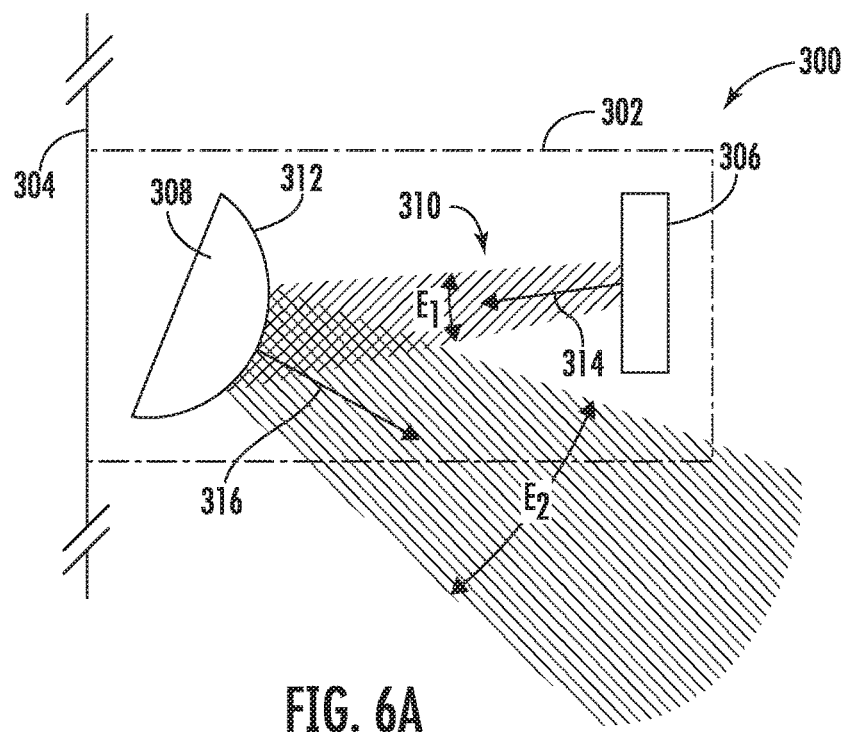
Figure 6B:
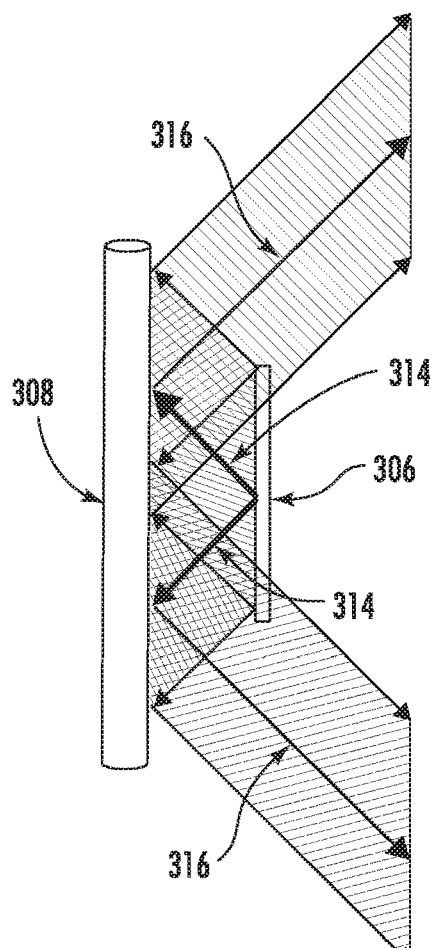
Figure 7:
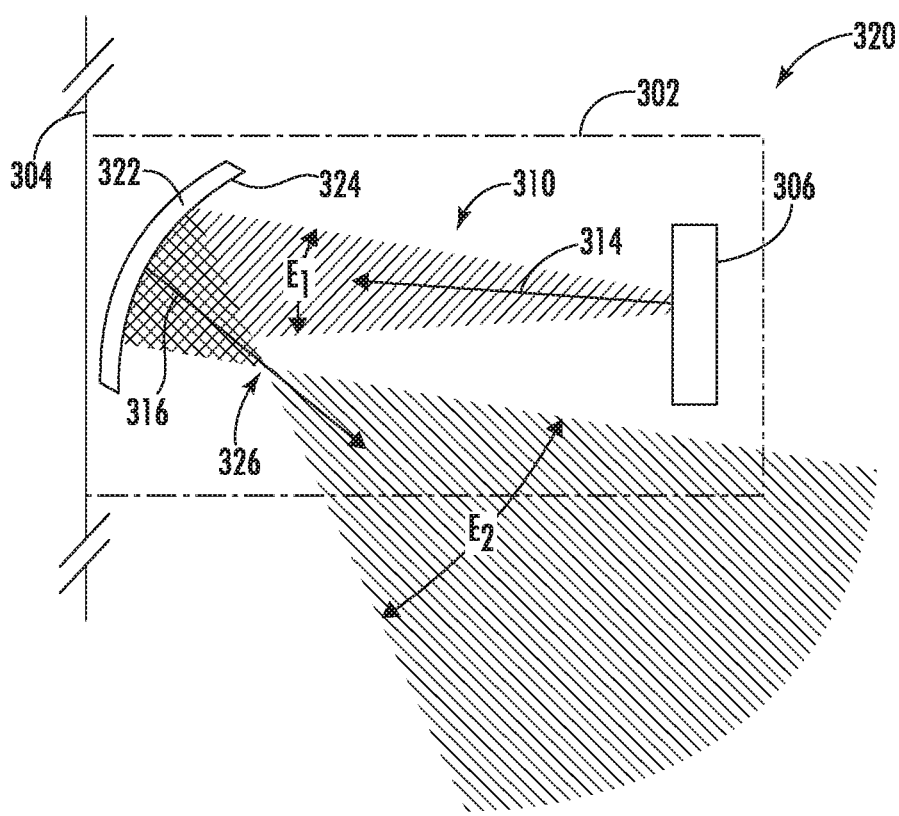
Figure 8:
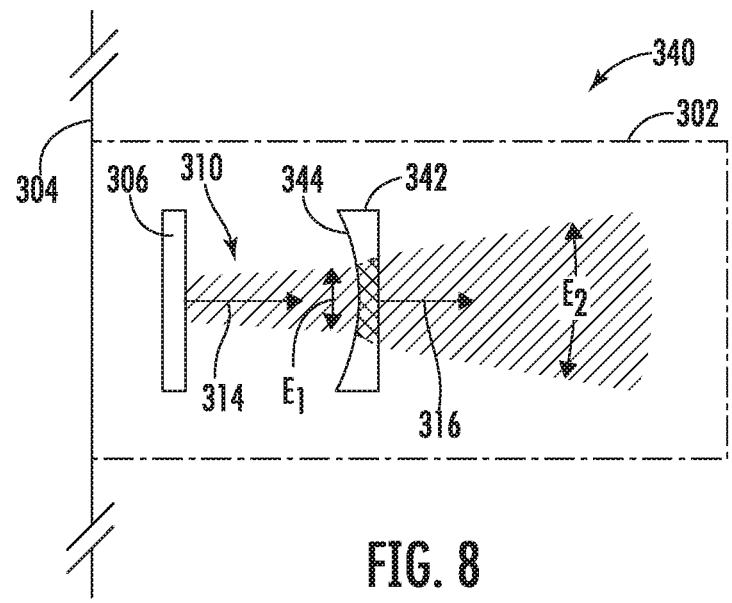
Figure 9:
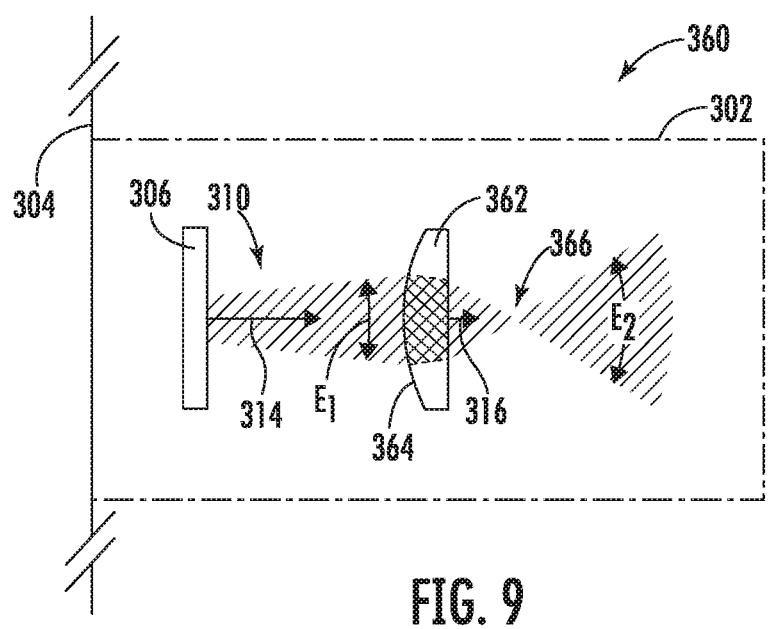
Figure 10:
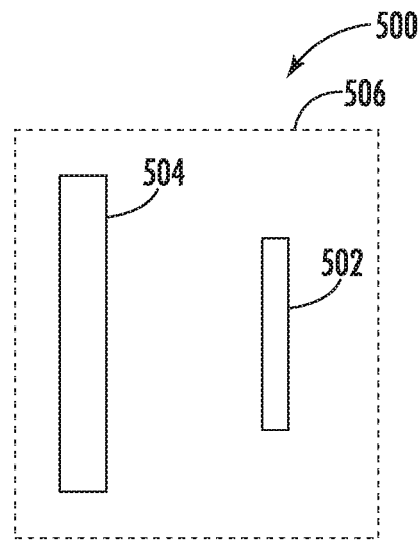
Figure 11:
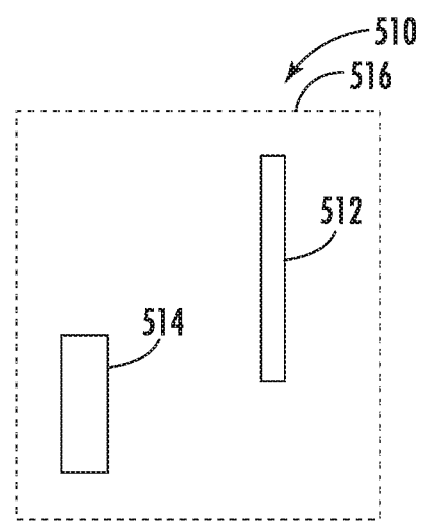
Figure 12:
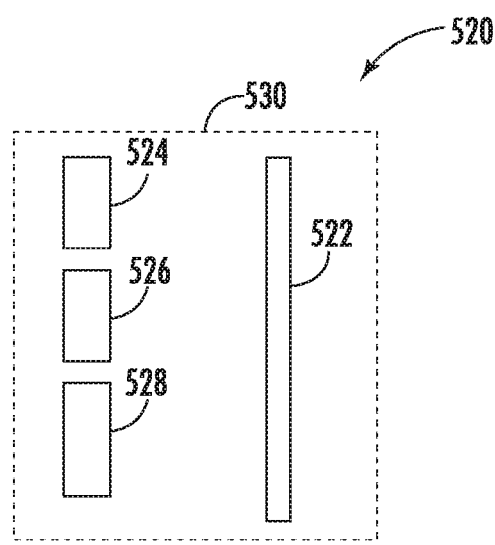
Figure 13:
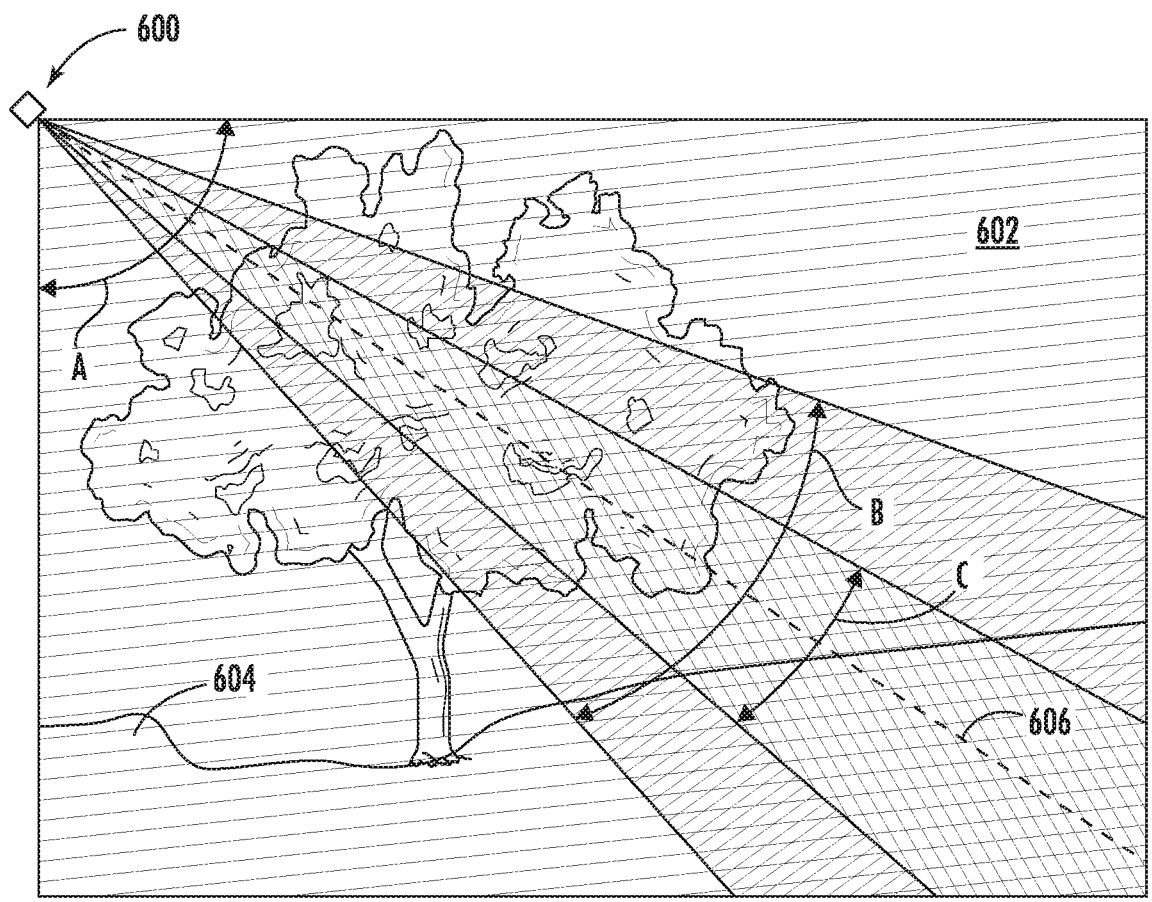

Having thus described the invention in general terms, reference will now be made to the accompanying drawings, which are not necessarily drawn to scale, and wherein:

FIG. 1 is a schematic side view of an example vessel (e.g., water craft) including a sonar transducer assembly in accordance with some embodiments discussed herein;

FIG. 2 is a block diagram of an example marine electronic system in accordance with some example embodiments discussed herein;

FIG. 3 is a schematic perspective view of a frequency-steered transducer array producing an acoustic beam in accordance with some example embodiments discussed herein;

FIG. 4 is a schematic side view of the frequency-steered transducer array and acoustic beam of FIG. 3;

FIG. 5 is a schematic plan view of the frequency-steered transducer array and acoustic beam of FIG. 3;

FIG. 6A is a schematic side view of a sonar system coupled with a vessel in accordance with some example embodiments discussed herein;

FIG. 6B is a schematic top view of the sonar system of FIG. 6A in accordance with some example embodiments discussed herein;

FIG. 7 is a schematic side view of another sonar system coupled with a vessel in accordance with some example embodiments discussed herein;

FIG. 8 is a schematic side view of another sonar system coupled with a vessel in accordance with some example embodiments discussed herein;

FIG. 9 is a schematic side view of another sonar system coupled with a vessel in accordance with some example embodiments discussed herein;

FIG. 10 is a schematic plan view of another sonar system in accordance with some example embodiments discussed herein;

FIG. 11 is a schematic plan view of another sonar system in accordance with some example embodiments discussed herein;

FIG. 12 is a schematic plan view of another sonar system in accordance with some example embodiments discussed herein;

FIG. 13 is a schematic side view of a sonar system comparing the completeness of a sonar image of underwater environment captured by acoustic beams having different transverse beam widths; and FIG. 14 is a flowchart of an example method in accordance with some example embodiments discussed herein.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of _____ and _____," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," or the like, as used herein does not necessarily refer to the same embodiment, although it may.

Example Environment

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar, or acoustic, beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be or include a transducer array, e.g. a "phased array" or a "frequency-steered array." The transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, and each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. acoustic beams, into a body of water with a transmit transducer, a transmit/receive transducer, or similar device. When the sound waves of the acoustic beams strike anything of differing acoustic impedance (e.g., the sea floor or something suspended in the water above the bottom), the acoustic waves reflect off that object. These echoes (or sonar return signals) may strike the transmitting transducer element and/or a separate one or more sonar receiver elements, which convert the echoes back into an electrical signal which is processed by a processor (e.g., processing circuitry 407 and/or a sonar signal processor 465 as discussed in reference to FIG. 2) and sent to a display (e.g., an LCD) mounted in the cabin or other convenient location in the watercraft. This process may be referred to as "sounding." Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducer assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In various embodiments, any known method of electronic beamforming may be used with the transducer elements and/or transducer array to generate acoustic beams and to receive and interpret sonar return signals. Conventional and/or adaptive beamforming methods and associated signal processing circuitry, including phased arrays, may be used in various embodiments. Transducer arrays used with some example embodiments of the present invention may be configured to generate steerable acoustic beams.

For example, some example embodiments may employ frequency division transmit and/or receive beamforming, which is described above. Additional information regarding frequency-steered arrays is provided in U.S. Pat. No. RE45,379, entitled "Frequency Division Beamforming for Sonar Arrays," and in U.S. Pat. No. 7,606,114, entitled "Systems and Methods Implementing Frequency-Steered Acoustic Arrays for 2D and 3D Imaging," the entire disclosures of each of which are incorporated by reference herein for all purposes.

Other example embodiments may employ beamforming techniques wherein time delays are applied to the elements of the transducer array to compensate for the difference in propagation time of an acoustic wave in the water. The time delays are equivalent to applying a phase shift, which is a linear function of frequency, to each element. In various embodiments, all of the transducer elements may be connected to a single transmitter and/or receiver, or each transducer element (or groups of transducer elements) may have a digital receiver/exciter connected to it. In some example embodiments, the returns from a transducer array and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. Pat. No. 10,114,119, entitled "Sonar Systems and Methods Using Interferometry and/or Beamforming for 3D Imaging," and U.S. Pat. No. 9,739,884, entitled "Systems and Associated Methods for Producing a 3D Sonar Image," both of which are assigned to the Assignee of the present application and are hereby incorporated by reference herein in their entireties for all purposes.

In an example embodiment, a vessel 100 may include a main propulsion motor 105, such as an outboard or inboard motor. Additionally, the vessel 100 may include a trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Example Architecture

FIG. 2 shows a block diagram of a computing device, such as user device 403. A depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine system 400.

The marine electronic device 405 may include a processor 410, a memory 420, a user interface 435, a display 440, one or more sensors (e.g. position sensor 445, other sensors 447, etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device 405 may transmit or receive data, such as sonar signals, sonar returns, sonar image data or the like to or from a transducer assembly 462, more particularly to or from a sonar signal processor 465. In some embodiments, the marine electronic device 405 may also be configured to communicate with a propulsion system 409 of the vessel 100. The marine electronic device 405 may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 2 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The transducer assembly 462 may comprise a transducer array 469 that receives signals from and returns signals to a sonar signal processor 465. Sonar signal processor 465 may comprise suitable beamforming hardware and/or software with which those of skill in the art are familiar and which may vary depending on the method of beamforming employed. In the illustrated embodiment, transducer assembly 462 may employ frequency division beamforming, and thus sonar signal processor 465 may comprise a signal generator 466, a phase selector 467, and a return signal analyzer 468. In some embodiments, signal generator 466, in conjunction with phase selector 467, may supply signals with fixed phase differences to array 469. The phase differences may be adjustable in some embodiments. The array 469 in response to the signals generates an acoustic beam whose direction can be varied within a certain range. Signal generator 466 may be a broadband signal generator in some embodiments, and thus it may simultaneously provide array 469 with signals having a range of frequencies and a fixed phase difference, such that the resulting acoustic signal simultaneously propagates towards a range of directions. The return signal analyzer 468 may analyze reflected acoustic signals that result from the transmitted acoustic beam. Where signal generator 466 is a broadband signal generator, return signal analyzer 468 may be a spectrum analyzer that may divide the range of frequencies into a plurality of discrete frequency bins, thereby effectively yielding a plurality of simultaneous beams that point in different directions.

In various embodiments, sonar signal processor 465 may cause transducer array 469 to generate sound in the directions including endfire (e.g., ninety degrees from broadside) and close to normal (e.g., about nineteen (19) degrees from normal in the case of a $\pi/2$ element-to-element phase difference). In various embodiments, where transducer array 469 is wired to produce this fixed ninety-degree phase difference with two differential signal channels, then subsectors of the physically possible range may be selected, and those subsectors can have angular widths anywhere within the allowable frequency range from endfire (e.g., lowest frequency) to spatial aliasing (e.g., the first grating lobe) near nineteen (19) degrees from broadside. In various embodiments, the possible angles of operation are symmetric about the broadside direction.

As those of skill in the art will appreciate, the principles of operation for frequency division transmitting systems also apply to frequency division receiving systems. Thus, transducer assembly 462 may comprise one or more additional signal processors and/or receive beamforming circuitry in some embodiments, or sonar signal processor 465 may comprise receive beamforming circuitry. As noted above, with receive beamforming, receive beamforming circuitry may apply phase shifts to received signals from each transducer element.

In some embodiments, the sonar signal processor 465 may be configured to select individual transducer elements to gather sonar return data and/or cause transmission. Although depicted in the transducer assembly 462, it would be immediately understood by one of ordinary skill in the art that the sonar signal processor 465 may be a portion of the user device 403, the marine electronic device 405, the processing circuitry 407, the processor 410, or another remote device/system. Also, transducer array 469 may comprise transmit transducer elements, receive transducer elements, and/or transmit/receive transducer elements.

The propulsion system 409 may include the main propulsion motor 105 and/or trolling motor 108. The propulsion motor 105 and/or the trolling motor 108 may include one or more sensors to measure operation or speed of main propulsion motor 105 and/or the trolling motor 108.

Example Sonar Systems

First, certain aspects of an exemplary configuration and geometry of a transducer array and a resulting acoustic beam are discussed with reference to FIGS. 3-5. These figures present schematic perspective, side, and plan views of a frequency-steered transducer array 200 producing an acoustic beam 202 in accordance with some example embodiments. When used herein, the terms "beam" and "acoustic beam" may refer to a sound wave propagating in a well-defined direction, but they may also refer to a portion of a sound wave pattern wherein the portion propagates along a given direction. Those of skill in the art will appreciate that dispersion of a beam may occur for various reasons, and thus the depictions of acoustic beam 202 in the present disclosure are simplified for the purpose of illustration. Additionally, some example embodiments are described below in the context of sound waves emanating from a transducer array, and thus in FIGS. 3-5 acoustic beam 202 is depicted as propagating away from transducer array 200. However, those of skill in the art will appreciate that, in accordance with the principle of reciprocity for waves, embodiments of the present invention are equally applicable to the reverse process of receiving acoustic waves.

More particularly, transducer array 200 comprises a plurality of transducer elements 204 (FIG. 3). The dimensions and relative positions of transducer elements 204 may be selected by those of skill in the art based on the particular implementation and method used to generate acoustic beam 202. For ease of illustration, transducer array 200 is depicted as a linear array in FIGS. 3-5, but in other example embodiments any suitable transducer array 200 may be used. Thus, in some example embodiments, transducer array 200 may be a planar, or "2D," array having any particular shape or may be a "3D" array having any particular shape. Likewise, while transducer elements 204 are depicted as rectangular in shape, having a greater height (or elevation) than width, in other embodiments transducer elements 204 may have any suitable shape.

As those of skill in the art will appreciate, the shape of transducer elements 204 may affect the transmitting and receiving beam patterns of individual transducer elements, and the responses of the individual elements may be integrated to obtain the array response. In this regard, as explained above, the elevation of a transducer element affects the transverse beam width, in that a larger elevation leads to a smaller transverse beam width. The pitch, or center-to-center distance between transducer elements, may determine the frequency range of operation, and thus the pitch may also limit the dimensions of the elements. Also, the radiating area of the elements affects the acoustic power generated by the array on transmission. Furthermore, the need to obtain a good signal to noise ratio may affect the dimensions of transducer elements. In particular, where the transmitter is separated from the receiver, receiving transducer elements may be made smaller (thus achieving a naturally larger transverse beam width) than transmitting transducer elements without undue degradation in the signal levels.

As noted above, transducer elements 204 of transducer array 200 may be in electronic communication with suitable beamforming circuitry, such as sonar signal processor 465 described above, for generating one or more acoustic beams 202 that emanate from transducer array 200. Those of skill in the art are familiar with suitable beamforming circuitry and can provide such components in accordance with the disclosure herein.

As shown, transducer array 200 may have a longitudinal axis 206 and a transverse axis 208. In various embodiments, transverse axis 208 may be disposed perpendicularly to longitudinal axis 206. Likewise, in some example embodiments, longitudinal axis 206 may be an axis that extends along and/or contains the centerlines of a plurality of transducers in transducer array 200. In general, in various example embodiments, and depending on the mounting location and orientation of transducer array 200 with respect to a vessel, longitudinal axis 206 may extend in an alongship, or stern to bow, direction. Correspondingly, in various example embodiments, and again depending on the way in which transducer array 200 is mounted, transverse axis 208 may extend either in an athwartship, or port to starboard, direction, or in an up-down, or hull to deck, direction. Where, for example, transducer array 200 is intended for use in generating a live side-scan view of an underwater environment, transverse axis 208 may extend in the up-down, or hull to deck, direction. Of course, those of skill in the art will appreciate that in other embodiments, transverse axis 208 may be disposed at an angle relative to the horizontal or vertical, and thus may be neither up-down or athwartship in some embodiments. Similarly, in various embodiments the longitudinal axis 206 may be disposed at an angle relative to the alongship centerline of the vessel, and thus may not be parallel with the alongship centerline of the vessel in some embodiments. Again, axes 206, 208 may vary in position depending on the mounting position and intended use of transducer array 200. For example, the longitudinal axis 206 may extend athwartship, while the transverse axis 208 extends along ship.

As shown in FIGS. 3-5, acoustic beam 202 may have a beam direction 210. In general, beam direction 210 may be the direction in which acoustic beam 202 propagates away from array 200, and it may be defined relative to a plane defined by the faces of transducer elements 204 in transducer array 200, or it may also be defined relative to a line extending perpendicularly to such a plane. In some embodiments, beam direction 210 may be parallel with a line extending perpendicularly from the plane defined by the faces of transducer elements 204. In other embodiments, such as where transducer array 200 is operative to generate one or more steerable acoustic beams, beam direction 210 may, at least at times, be disposed at an angle to the line extending perpendicularly from the plane defined by the faces of transducer elements 204. Those of skill in the art are familiar with various methods for determining beam direction 210, which may differ depending on the manner in which acoustic beam 202 is generated.

For example, where acoustic beam 202 is generated using a frequency-steered array, beam direction 210 may be determined by the relationship: $\cos(\theta)=(\Delta\varphi/2\pi)(c/fd)$, where $\theta$ represents a direction angle relative to a plane defined by the transducer elements 204, $\Delta\varphi$ represents a phase shift between the signals applied to adjacent transducer elements 204, c represents the velocity of the acoustic beam 202, f represents the frequency of the signals applied to transducer elements 204, and d represents the spacing between the adjacent transducer elements 204. Likewise, where acoustic beam 202 is generated using conventional beamforming techniques, the same relationship may be used to determine beam direction 210, except that with a conventional beamformer, beam 202 may be formed as a function of frequency, e.g., at each of many frequencies in its band of operation, and at each frequency, the conventional beamformer may use a different phase to determine the steering direction of the individual beam.

Referring to FIGS. 4 and 5, a transverse plane 212 may extend along the beam direction 210 and contain transverse axis 208. Also, a steering plane 214 may extend along the beam direction and contain longitudinal axis 206. Thus, in some example embodiments, transverse plane 212 may be disposed orthogonally to steering plane 214. Acoustic beam 202 may have a beam width E along transverse plane 212 and a beam width A along steering plane 214. As used herein, the term "beam width" may refer to the angle between the half power (3 dB, −3 dB) points of the main lobe of an acoustic beam or beam pattern, measured in degrees.

Sonar systems in accordance with various example embodiments of the present invention are discussed with reference to FIGS. 6A-9. In the side views presented in these figures, the longitudinal axis of the transducer arrays is coming out of the page, whereas the transverse axis of the transducer arrays extends along the page. In particular, FIG. 6A is a schematic side view of a sonar system 300 comprising a housing 302 that is coupled with the hull 304 of a vessel. In the illustrated embodiment, sonar system 300 comprises a transducer array 306 and a beam spreading device 308. Transducer array 306 may be analogous to some of the transducer arrays described in greater detail above, and it is operative (e.g., in conjunction with a suitable processor and/or beamforming circuitry or software, not shown in FIG. 6A) to generate at least one acoustic beam 310, which may be analogous to acoustic beam 202, described above. It will be appreciated, however, that housing 302 is not required in all embodiments, and in some embodiments, one or all of the components described as being disposed within housing 302 may be disposed exterior thereof. Indeed, in some embodiments, transducer array 306 and/or beam spreading device 308 may be disposed within hull 304, with or without housing 302.

In various embodiments, a beam spreading device may be disposed in a fixed position relative to a transducer array, though it could be moveable in some embodiments. Also, in various embodiments, the beam spreading device may have a longitudinal axis that is parallel with the longitudinal axis of the transducer array, though this is not required in all embodiments. Further, as discussed in greater detail below, beam spreading devices in accordance with various embodiments are preferably disposed at a distance from and orientation relative to the transducer array(s) that is sufficient to permit reflection of an acoustic beam that is transmitted from the transducer array in a direction that does not cause the reflected acoustic beam to impinge upon the transducer array before it reaches an interrogated object. Additionally, beam spreading devices in accordance with various embodiments are preferably disposed at a distance from and orientation relative to the transducer array(s) that minimizes the size of the overall assembly or does not render it too large. In some embodiments, the beam spreading device may be placed relatively close to the transducer array(s) so that it covers the entire emitted beam(s) with minimal girth. In multi-array solutions, tracing the rays of various beams may be performed in order to design and implement a configuration that avoids unwanted interference.

Beam spreading device 308 in the illustrated embodiment includes at least one non-flat or non-planar beam spreading surface 312. As described herein, a beam spreading surface in various embodiments may define a variety of shapes, but it may preferably be a curved surface that will not create undesirable diffusion of or destructive interference within the transmitted acoustic beam. In some embodiments, the beam spreading surface may be a cylindrical surface. In some embodiments herein, a beam spreading device may define a uniform cross-section along its length. Also, in some embodiments, a beam spreading surface may have a uniform shape along the length of the beam spreading device. However, in various embodiments, a beam spreading device may comprise more than one beam spreading surface, which may have different shapes. In some example embodiments, the curve of the beam spreading device's beam spreading surface and/or its corresponding radius of curvature lie on a plane that is parallel with the transverse axis of the transducer array. In FIG. 6A, beam spreading surface 312 is convex with respect to the face of transducer array 306 from which acoustic beam 310 propagates. In other words, beam spreading device 308 may define a cross-section that is at least partially circular.

As discussed above with reference to FIGS. 3-5, acoustic beam 310 may have a beam first direction 314. In this regard, in various embodiments, a beam spreading device may be disposed with respect to the transducer array such that the beam spreading surface is positioned along the beam direction. In FIG. 6A, for example, beam spreading surface 312 is positioned along beam first direction 314. In other words, beam first direction 314 is defined such that acoustic beam 310 propagates in a direction that causes acoustic beam 310 to impinge upon beam spreading surface 312. Depending on the type of transducer array 306 and the method of beamforming used, software and/or suitable beamforming circuitry may be used to steer the beam 310 in such a direction, or in some cases, the desired beam first direction 314 may result from the orientation and geometry of the transducer array 306 relative to beam spreading device 308. Likewise, acoustic beam 310 may have a first beam width $E_1$ in a first transverse plane (not shown in FIG. 6A).

In various embodiments, a beam spreading device, or at least the portion thereof that comprises the beam spreading surface(s) 312, may be formed of any suitable material suitable to cause reflection of an acoustic beam. The material may be selected such that diffusion of acoustic wave 310 does not occur, or is minimized, as a result of the reflection. In various embodiments, beam spreading device 308 may be a smooth reflector made from a homogeneous material, such that it presents a regular smooth geometric impedance discontinuity relative to the material bearing the incident wave. In some embodiments, the law of reflection may apply continuously over the surface 312, and the reflection coefficient at any location may be determined by the angle of incidence and the characteristic impedance of the material from which beam spreading surface 312 and/or beam spreading device 308 is made, which may be uniform throughout the structure. In some embodiments, beam spreading device 308 may be formed of a relatively soft, or compliant material. In some embodiments, beam spreading device 308 may be formed of a foam material.

As shown in FIG. 6A, acoustic beam 310 may be reflected off of beam spreading surface 312. More particularly, in the case of reflection, those of skill in the art will appreciate that, in general, the wavefront shape and phase of the wavefront may change at the boundary. In various embodiments, however, the phase may not vary along beam spreading device 308 and/or beam spreading surface 312. In some embodiments, the surface may be an ideal reflector, or as close as possible thereto, in that the reflection coefficient may be nearly perfectly real and may have a magnitude close to 1 (either positive or negative). For example, if the reflection coefficient is considered to be −1, then the sound pressure is inverted at the boundary, but the spectral content and direction in the longitudinal plane may remain unchanged.

Following impingement on beam spreading surface 312, acoustic wave 310 may have a beam second direction 316. In the illustrated embodiment, beam first direction 314 and beam second direction 316 are different, but as discussed below, that is not required in all embodiments. In this regard, due to the orientation of transducer array 306 and beam spreading device 308, beam first direction 314 may be aimed at an exterior surface of hull 304 such that acoustic beam 310 reflects off the beam spreading surface 312 away from the exterior surface of the hull 304.

Likewise, following reflection off of beam spreading surface 312, acoustic beam 310 may have a second beam width $E_2$ in a second transverse plane (also not shown in FIG. 6A). As discussed in more detail below, the second transverse plane may be parallel with, contain, or be disposed at an angle to the first transverse plane, depending on the relative geometry of transducer array 306 and beam spreading device 308. However, both the first and second transverse planes may be parallel with the transverse axis of transducer array 306.

As those of skill in the art will appreciate, in various embodiments, the acoustic waves incident upon and reflected from beam spreading device 308 may interact. In this regard, FIG. 6B is a schematic top view of sonar system 300 in accordance with an example embodiment. Housing 302 and hull 304 are not depicted in FIG. 6B for ease of illustration. Also, in this embodiment, beam spreading device 308 defines a cross-section that is circular, rather than half-circular as shown in the embodiment of FIG. 6A. As shown, in some embodiments, transducer array 306 may produce two symmetric angular sectors of sound, and there may be a dead sector between the ensonified sectors. In this regard, FIG. 6B illustrates two symmetric beams each at 45 degrees relative to the normal. Those of skill in the art will appreciate, however, that the direction of the beams may change via beam steering techniques, such as varying the frequency in the case that transducer array 306 is a frequency-steered array. Thereby, transducer array 306 may provide a field of view in the longitudinal plane that is greater than that shown in FIG. 6B. In any event, in various embodiments, the region (e.g., between transducer array 306 and beam spreading device 308) in which the incident and reflected waves interact may not be less coherent or less well-defined, as long as the amplitude is small enough to remain linear. Many of the embodiments discussed herein will remain in the linear regime. However, in some embodiments, such as those discussed below in which a reflected acoustic beam is focused to a focal point, it is possible that pressure amplitudes may increase at the focus and could become nonlinear. If this occurs, energy may naturally be dispersed in space and time, and the signal level may be diminished. Thus, in these embodiments, this is another factor that those of skill in the art may need to consider in configuring and selecting the relative geometry of the beam spreading device and transducer array.

Referring again to FIG. 6A, second beam width $E_2$ is greater than first beam width $E_1$. In various embodiments, first beam width $E_1$ may be between about twelve (12) and twenty-eight (28) degrees, and second beam width $E_2$ may be between about twenty-nine (29) and ninety (90) degrees. In some embodiments, second beam width $E_2$ may be up to one hundred eighty (180) degrees. Of course, these transverse beam widths will vary depending on the particular implementation and geometry between transducer array 306 and beam spreading device 308, the type of electronic beamforming used to generate acoustic beam 310, and/or the shape of beam spreading surface 312, among other factors. In various embodiments, the transverse beam width may be selected to provide a sufficiently wide field of view for the intended application.

Also, a beam spreading device in accordance with some example embodiments preferably is positioned with respect to the transducer array such that, following impingement upon and reflection off of the beam spreading surface, the reflected portion of the acoustic beam does not interfere with transducer array. In some embodiments, the beam spreading device and/or beam spreading surface may be disposed vertically above or below the face of the transducer array from which the acoustic beam emanates, and in some embodiments, the beam spreading device may be rotated or disposed at an angle relative to the orientation of the transducer array. As can be seen in FIG. 6A, for example, the relative geometries of transducer array 306, beam spreading device 308, and beam spreading surface 312 are selected such that neither the beam second direction 316 nor the second beam width $E_2$ cause any portion of the transmitted acoustic beam 310 to impinge upon transducer array 306 before arriving at the object to be interrogated. However, in various embodiments, sonar systems such as sonar system 300 may be configured to be perfectly reciprocal, such that an acoustic beam returning from an interrogated object will impinge upon the beam spreading surface and then be reflected toward the transducer array.

Particularly in the case where the transducer array used is a frequency-steered array, the spatial relationship between and relative orientations of the transducer array, beam spreading device, and/or beam spreading surface preferably are selected such that, as the acoustic beam is steered, changes in the frequency of the signals applied to the transducer elements do not materially change the second transverse beam width. In other words, and with reference to FIG. 6A, acoustic beam 310 preferably is steerable by varying the frequency of the signals applied to the transducer elements in transducer assembly 306 without the transverse beam width $E_2$ having a significant "frequency-dependent component." As those of skill in the art will appreciate, however, in the case of frequency-steered arrays, even where a beam spreading device is not used, the beam width of an acoustic beam emitted from the array may have a beam width in the both the longitudinal and transverse directions that changes to an extent as the beam is steered in different directions. In other words, with this type of array, the beam width in the longitudinal and transverse directions varies with frequency. Thus, some change in transverse beam width may be expected as the frequency is changed and the beam is steered. Also, in various embodiments, use of a beam spreading device may cause greater spreading of lower frequency beams than with higher frequency beams, but because the mapping in time may not change, features in a given scene should not be distorted.

In various example embodiments, a beam spreading surface of a beam spreading device need not be convex with respect to the face of the transducer array from which the acoustic beam emanates. Likewise, in various example embodiments, the increased transverse beam width $E_2$ of an acoustic beam need not be achieved using reflection of an acoustic beam off of a beam spreading surface. In this regard, FIGS. 7-9 are respective schematic side views of sonar systems 320, 340, and 360 in accordance with other example embodiments. Certain aspects of sonar systems 320, 340, and 360 are preferably analogous to corresponding aspects of sonar system 300, described above, and in these figures, like reference numerals refer to like components.

Turning to FIG. 7, in this embodiment, sonar system 320 comprises a beam spreading device 322. Beam spreading device 322 has at least one beam spreading surface 324. Unlike beam spreading surface 312 above, beam spreading surface 324 in this example is concave with respect to the face of transducer array 306 from which acoustic beam 310 emanates. However, as with beam spreading device 308 above, beam spreading device 322, or at least the portion thereof comprising beam spreading surface 324, may be formed of any material suitable to cause reflection of an acoustic beam. The material may be selected such that diffusion of acoustic wave 310 does not occur, or is minimized, as a result of the reflection. In some embodiments, beam spreading device 322 may be formed of a relatively soft or compliant material. In some embodiments, beam spreading device 322 may be formed of a foam material.

Acoustic beam 310 again has a beam first direction 314, and beam spreading device 322 may be disposed with respect to the transducer array 306 such that the beam spreading surface 324 is positioned along the generated acoustic beam 310's direction. In other words, beam first direction 314 is defined such that acoustic beam 310 propagates in a direction that causes acoustic beam 310 to impinge upon beam spreading surface 324. Again, depending on the type of transducer array 306 and the method of beamforming used, software and/or suitable beamforming circuitry may be used to steer the beam 310 in such a direction, or in some cases, the desired beam first direction 314 may result from the orientation and geometry of the transducer array 306 relative to beam spreading device 322. Likewise, acoustic beam 310 may have a first beam width $E_1$ in a first transverse plane (not shown in FIG. 7).

As shown in FIG. 7, acoustic beam 310 may be reflected off of beam spreading surface 324. Following impingement on beam spreading surface 324, acoustic wave 310 may have a beam second direction 316. In the illustrated embodiment, beam first direction 314 and beam second direction 316 are different, but again, that is not required in all embodiments. In this regard, due to the orientation of transducer array 306 and beam spreading device 308 in FIG. 7, beam first direction 314 may be aimed at an exterior surface of hull 304 such that acoustic beam 310 reflects off the beam spreading surface 312 away from the exterior surface of the hull 304.

Because beam spreading surface 324 is concave in this embodiment, acoustic beam 310 may be focused to a focal point 326, after which acoustic beam 310 may diverge or spread in the transverse plane as it continues to propagate. Following reflection off of beam spreading surface 324, acoustic beam 310 may have a second beam width $E_2$ in a second transverse plane (also not shown in FIG. 7). Again, the second transverse plane may be parallel with, contain, or be disposed at an angle to the first transverse plane, depending on the relative geometry of transducer array 306 and beam spreading device 322. However, both the first and second transverse planes may be parallel with the transverse axis of transducer array 306.

As shown in FIG. 7, second beam width $E_2$ is greater than first beam width $E_1$. In various embodiments, first beam width $E_1$ may be between about twelve (12) and twenty-eight (28) degrees, and second beam width $E_2$ may be between about twenty-nine (29) and ninety (90) degrees. Of course, these transverse beam widths will vary depending on the particular implementation and geometry between transducer array 306 and beam spreading device 322, the type of electronic beamforming used to generate acoustic beam 310, and the shape of beam spreading surface 324, among other factors.

As with the embodiment shown in FIGS. 6A-6B, in the example of FIG. 7, the relative geometries of transducer array 306, beam spreading device 322, and beam spreading surface 324 are selected such that neither the beam second direction 316 nor the second beam width $E_2$ cause any portion of the transmitted acoustic beam 310 to impinge upon transducer array 306 before arriving at the object to be interrogated. However, in various embodiments, sonar systems such as sonar system 320 may be configured to be perfectly reciprocal, such that an acoustic beam returning from an interrogated object will impinge upon the beam spreading surface and then be reflected toward the transducer array.

Next, with reference to FIG. 8, in this embodiment, sonar system 340 comprises a beam spreading device 342. Beam spreading device 342 has at least one beam spreading surface 344. Unlike beam spreading surface 312 above, beam spreading surface 344 in this example is concave with respect to the face of transducer array 306 from which acoustic beam 310 emanates. In FIG. 8, the beam spreading device 342 may resemble a plano-concave lens viewed from the side. In other example embodiments, however, the beam spreading device may define a variety of other shapes and/or beam spreading surfaces that are analogous to various optical element shapes, and may have, for example, plano-convex, biconvex, biconcave, positive meniscus, and/or negative meniscus surfaces, as needed or desired. Additionally, unlike both beam spreading devices 308, 322 described above, beam spreading device 342, or at least the portion thereof comprising beam spreading surface 344, is formed of any suitable material to permit acoustic beam 310 to pass therethrough, rather than be reflected.

In particular, the acoustic beam 310 may be refracted as it passes through the interface between the material in which it initially travels (e.g., the water, or air within housing 302) and the material of beam spreading device 342, in which the speed of sound may differ. Thus, in some respects, beam spreading device 342 may be analogous to an acoustic lens. Accordingly, beam spreading device 342 may be formed of materials identical or similar to those used in acoustic lenses, such as polystyrene. In some embodiments, beam spreading device 342 may be formed of an acrylic material. Also, in some embodiments, beam spreading device 342 may be formed from a material in which the speed of sound is greater than the speed of sound in water (or certain types of water, such as fresh water, etc.). The material may be selected such that diffusion of acoustic wave 310 does not occur, or is minimized, as a result of the refraction.

Additionally, those of skill in the art will appreciate that, in the case of refraction of acoustic beam 310, some reflection may nonetheless occur. In some embodiments, beam spreading device 342 may be disposed or angled with respect to transducer array 306 such that reflected rays do not intersect with transducer array 306. In some embodiments, a beam spreading device 342 formed of a high sound speed material may be bonded directly to transducer array 306. Doing so may eliminate one of the refractive surfaces.

Acoustic beam 310 again has a beam first direction 314, and beam spreading device 342 may be disposed with respect to the transducer array 306 such that the beam spreading surface 344 is positioned along the generated acoustic beam 310's direction. In other words, beam first direction 314 is defined such that acoustic beam 310 propagates in a direction that causes acoustic beam 310 to impinge upon beam spreading surface 344. Again, depending on the type of transducer array 306 and the method of beamforming used, software and/or suitable beamforming circuitry may be used to steer the beam 310 in such a direction, or in some cases, the desired beam first direction 314 may result from the orientation and geometry of the transducer array 306 relative to beam spreading device 342. Likewise, acoustic beam 310 may have a first beam width $E_1$ in a first transverse plane (not shown in FIG. 8).

As noted above, acoustic beam 310 may be refracted by beam spreading device 342. Following impingement on beam spreading surface 344, acoustic wave 310 may have a beam second direction 316. In the illustrated embodiment, beam first direction 314 and beam second direction 316 may be at least substantially the same, though they need not be collinear, and of course their relative orientations may change based on the relative orientations and positions of transducer array 306 and beam spreading device 342 and the angle of incidence of acoustic beam 310 on beam spreading device 342. Additionally, in contrast to the embodiments shown above in FIGS. 6 and 7, due to the orientation of transducer array 306 and beam spreading device 342 and the material selected for beam spreading device 342 in the embodiment of FIG. 8, both beam first direction 314 and beam second direction 316 may be aimed away from an exterior surface of hull 304.

Acoustic beam 310 may be diverged or spread out as it continues to propagate following refraction by beam spreading device 342. As those of skill in the art will appreciate, the direction of the refracted acoustic beam 310 may depend upon the change in phase speed and the angle of incidence upon beam spreading surface 344. Following refraction by beam spreading device 342, acoustic beam 310 may have a second beam width $E_2$ in a second transverse plane (also not shown in FIG. 8). Again, the second transverse plane may be parallel with, contain, or be disposed at an angle to the first transverse plane, depending on the relative geometry of transducer array 306 and beam spreading device 342. However, both the first and second transverse planes may be parallel with the transverse axis of transducer array 306.

As shown in FIG. 8, second beam width $E_2$ is greater than first beam width $E_1$. In various embodiments, first beam width $E_1$ may be between about twelve (12) and twenty-eight (28) degrees, and second beam width $E_2$ may be between about twenty-nine (29) and ninety (90) degrees. Of course, these transverse beam widths will vary depending on the particular implementation and geometry between transducer array 306 and beam spreading device 342, the type of electronic beamforming used to generate acoustic beam 310, and the shape of beam spreading surface 344, among other factors.

In the embodiment of FIG. 8, the relative geometries of transducer array 306, beam spreading device 342, and beam spreading surface 344, along with the angle of incidence of acoustic beam 310 on beam spreading surface 344 and the material from which beam spreading device 342 is made, may be selected such that no portion (or a minimal portion) of the transmitted acoustic beam 310 is reflected back to transducer array 306 before arriving at the object to be interrogated. However, in various embodiments, sonar systems such as sonar system 340 may be configured to be perfectly reciprocal, such that an acoustic beam returning from an interrogated object will impinge upon the beam spreading surface and then be refracted toward the transducer array.

Turning to FIG. 9, in this embodiment, sonar system 360 comprises a beam spreading device 362. Beam spreading device 362 has at least one beam spreading surface 364. Beam spreading surface 364 in this example is convex with respect to the face of transducer array 306 from which acoustic beam 310 emanates. In FIG. 9, the beam spreading device 362 may resemble a plano-convex lens viewed from the side. Additionally, unlike both beam spreading devices 308, 322 described above, and as with beam spreading device 342 described above, beam spreading device 362, or at least the portion thereof comprising beam spreading surface 364, is formed of any suitable material to permit acoustic beam 310 to pass therethrough, rather than be reflected.

In particular, the acoustic beam 310 may be refracted as it passes through the interface between the material in which it initially travels (e.g., the water, or air within housing 302) and the material of beam spreading device 362, in which the speed of sound may differ. Thus, in some respects, beam spreading device 362 may be analogous to an acoustic lens. Accordingly, beam spreading device 362 may be formed of materials identical or similar to those used in acoustic lenses, such as polystyrene. The material may be selected such that diffusion of acoustic wave 310 does not occur, or is minimized, as a result of the refraction.

Acoustic beam 310 again has a beam first direction 314, and beam spreading device 362 may be disposed with respect to the transducer array 306 such that the beam spreading surface 364 is positioned along the generated acoustic beam 310's direction. In other words, beam first direction 314 is defined such that acoustic beam 310 propagates in a direction that causes acoustic beam 310 to impinge upon beam spreading surface 364. Again, depending on the type of transducer array 306 and the method of beamforming used, software and/or suitable beamforming circuitry may be used to steer the beam 310 in such a direction, or in some cases, the desired beam first direction 314 may result from the orientation and geometry of the transducer array 306 relative to beam spreading device 362. Likewise, acoustic beam 310 may have a first beam width $E_1$ in a first transverse plane (not shown in FIG. 9).

As noted above, acoustic beam 310 may be refracted by beam spreading device 362. Following impingement on beam spreading surface 364, acoustic wave 310 may have a beam second direction 316. In the illustrated embodiment, beam first direction 314 and beam second direction 316 may be at least substantially the same, though they need not be collinear, and of course their relative orientations may change based on the relative orientations and positions of transducer array 306 and beam spreading device 362 and the angle of incidence of acoustic beam 310 on beam spreading device 362. Additionally, in contrast to the embodiments shown above in FIGS. 6 and 7, due to the orientation of transducer array 306 and beam spreading device 362 and the material selected for beam spreading device 362 in the embodiment of FIG. 9, both beam first direction 314 and beam second direction 316 may be aimed away from an exterior surface of hull 304.

Because beam spreading surface 364 is convex in this embodiment, beam spreading device 362 may focus acoustic beam 310 to a focal point 366, after which acoustic beam 310 may diverge or spread as it continues to propagate beyond focal point 366. Following refraction by beam spreading device 362, acoustic beam 310 may have a second beam width $E_2$ in a second transverse plane (also not shown in FIG. 9). Again, the second transverse plane may be parallel with, contain, or be disposed at an angle to the first transverse plane, depending on the relative geometry of transducer array 306 and beam spreading device 362. However, both the first and second transverse planes may be parallel with the transverse axis of transducer array 306.

As shown in FIG. 9, second beam width $E_2$ is greater than first beam width $E_1$. In various embodiments, first beam width $E_1$ may be between about twelve (12) and twenty-eight (28) degrees, and second beam width $E_2$ may be between about twenty-nine (29) and ninety (90) degrees. Of course, these transverse beam widths will vary depending on the particular implementation and geometry between transducer array 306 and beam spreading device 362, the type of electronic beamforming used to generate acoustic beam 310, and the shape of beam spreading surface 364, among other factors.

In the embodiment of FIG. 9, the relative geometries of transducer array 306, beam spreading device 362, and beam spreading surface 364, along with the angle of incidence of acoustic beam 310 on beam spreading surface 364 and the material from which beam spreading device 362 is made, may be selected such that no portion (or a minimal portion) of the transmitted acoustic beam 310 is reflected back to transducer array 306 before arriving at the object to be interrogated. However, in various embodiments, sonar systems such as sonar system 360 may be configured to be perfectly reciprocal, such that an acoustic beam returning from an interrogated object will impinge upon the beam spreading surface and then be refracted toward the transducer array.

As those of skill in the art will appreciate, a variety of configurations and geometries of transducer arrays and beam spreading devices are contemplated and within the scope of various embodiments of the invention. For instance, FIGS. 10-12 are schematic plan views of several other sonar systems in accordance with some example embodiments. In these figures, certain components may be analogous to corresponding components described above, and thus for the sake of brevity certain details are omitted in the description below. In the depicted configurations, the transverse axes of the transducer arrays are coming out of the page, whereas the longitudinal axes extend along the page. Depending on the direction in which the acoustic beam(s) are propagated or steered, and depending on the relative geometries of the beam spreading device(s) and transducer arrays, the first transverse plane may not be coplanar with the second transverse plane. Also, the beam spreading devices in these figures may be any of the beam spreading devices described above, and thus acoustic beams generated by the transducer arrays and reflected and/or refracted by the beam spreading devices are not shown in these figures. Correspondingly, the transducer arrays and beam spreading devices shown may be mounted relative to a vessel in any suitable orientation.

First, FIG. 10 shows a sonar system 500 comprising a transducer array 502 and a beam spreading device 504 disposed within a housing 506. In this embodiment, it is seen that beam spreading device 504 has a longitudinal axis that is parallel with the longitudinal axis of transducer array 502, and beam spreading device 504 and transducer array 502 are disposed in facing opposition. Transducer array 502 may be centered with respect to beam spreading device 504 in this embodiment. Additionally, in this example, beam spreading device 504 has a length that is greater than the length of transducer array 502.

Next, FIG. 11 shows a sonar system 510 comprising a transducer array 512 and a beam spreading device 514 disposed within a housing 516. In the depicted embodiment, beam spreading device 514 may have a longitudinal axis that is at an angle to the longitudinal axis of transducer array 512. Also, beam spreading device 514 and transducer array 512 are not centered with respect to one another, but rather beam spreading device 514 may be laterally offset relative to transducer array 512. In such embodiments, transducer array 512 may steer an acoustic beam or beams in the direction of beam spreading device 514. Further, in this example, beam spreading device 514 may have a length that is shorter than the length of transducer array 512.

FIG. 12 shows a sonar system 520 comprising a transducer array 522 and a plurality of beam spreading devices 524, 526, 528 disposed within a housing 530. In various example embodiments, any number of beam spreading devices may be provided. Likewise, although a single transducer array 522 is depicted, in various other embodiments, more than one transducer array may be provided. In the embodiment of FIG. 12, transducer array 522 may be a phased array operative to steer one or more acoustic beams in directions that intersect with beam spreading surfaces of beam spreading devices 524, 526, and/or 528. In some example embodiments, each of beam spreading devices 524, 526, and 528 may have a different beam spreading surface operative to modulate the transverse beam width of an acoustic beam in a different manner, or to a different extent.

In some embodiments, the beam spreading device may include a beam spreading surface that provides for beam spreading in more than a transverse plane, such as in both a transverse plane and a longitudinal plane (and/or other planes in between). In such an example, the beam spreading surface may be non-flat in multiple planes with respect to the incoming acoustic beam(s).

FIG. 13 is a schematic side view of a sonar system 600. In this figure, the longitudinal axis of the transducer array is coming out of the page. Thus, with a steerable array, the steering plane would be perpendicular to the page. Here, sonar system 600 may be configured to generate a live side scan image of an underwater environment 602, including a seabed 604.

Notably, FIG. 13 presents a comparison between the completeness of a sonar image of underwater environment 602 captured by acoustic beams having different transverse beam widths. In particular, FIG. 13 shows three acoustic beams respectively having beam widths A, B, and C in the transverse direction, each having a beam direction 606 (represented by the dashed line in FIG. 13). In this embodiment, transverse beam width A may be about ninety (90) degrees, transverse beam width B may be about twenty-eight (28) degrees, and transverse beam width C may be about fourteen (14) degrees.

As will be appreciated, where sonar system 600 is analogous to any of the sonar system embodiments of the present invention described above, it may generate acoustic beams having transverse beam widths like beam width A. Thus, it may be able to capture a much greater, or more complete, sonar image of underwater environment 602. In contrast, the acoustic beams having beam widths like beam width B and beam width C may be generated by prior art sonar systems 600. These can capture only a much more limited sonar image of underwater environment 602, and they do not produce a wide enough transverse field of view to include in a display the context necessary for an operator to easily and intuitively identify geometries outside of the narrow sector slice produced by the array. In other words, embodiments of the present invention may generate acoustic beams having wide transverse beam widths that enable an operator to view a sonar image that is more consistent with operators' common experience in viewing live image data.

Example Flowchart(s) and Operations

Embodiments of the present invention provide methods, apparatus and computer program products for operating a sonar system. Various examples of the operations performed in accordance with embodiments of the present invention will now be provided with reference to FIG. 14.

FIG. 14 illustrates a flowchart according to example methods for operating a sonar system according to an example embodiment. The operations illustrated in and described with respect to FIG. 14 may, for example, be performed by, with the assistance of, and/or under the control of one or more of the processor 410, memory 420, communication interface 430, user interface 435, position sensor 445, other sensor 447, transducer assembly 462, sonar signal processor 465, display 440, and/or propulsion system 409.

At operation 700, the process starts. At operation 702, a transducer array is provided. In various embodiments, the transducer array may have a transverse axis and a longitudinal axis disposed perpendicularly to the transverse axis. At operation 704, signals are associated with a plurality of transducers in the transducer array so as to form a first acoustic beam. In various embodiments, the first acoustic beam propagates in a beam first direction and has a first beam width in a first transverse plane, and the first transverse plane extends along the beam first direction and contains the transverse axis of the transducer array. Next, at operation 706, a beam spreading device having a curved surface may be disposed in a fixed position relative to the transducer array such that the first acoustic beam impinges on the curved surface. At operation 708, following impingement on the curved surface, the first acoustic beam is reflected or refracted by the beam spreading device such that the first acoustic beam propagates in a beam second direction and has a second beam width in a second transverse plane. In various example embodiments, the second transverse plane may extend along the beam second direction and may be parallel with the transverse axis of the transducer array. Also, in various example embodiments, the second beam width may be greater than the first beam width. In some embodiments, the beam second direction is different than the beam first direction. At operation 710, the process ends.

FIG. 14 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410 and/or the sonar signal processor 465. As will be appreciated, any such computer program product may be loaded onto a computer or other programmable apparatus (for example, a marine electronic device 405 and/or transducer assembly 462) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405 and/or transducer assembly 462) to cause a series of operations to be performed on the computer or other programmable apparatus to produce a computer-implemented process such that the instructions which execute on the computer or other programmable apparatus implement the functions specified in the flowchart block(s).

Conclusion

Based on the foregoing, it will be appreciated that embodiments of the invention provide improved systems and methods for expanding the transverse field of view in a sonar system. In various embodiments, an element may be included in the acoustic path of a transducer array, and the element may be designed to redistribute the sound traveling to and from the array for the purpose of expanding the transverse field of view. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A sonar system for a water craft, the sonar system comprising:
    a transducer array, wherein the transducer array defines a transverse axis and a longitudinal axis, the longitudinal axis extending orthogonal to the transverse axis, and wherein the transducer array is mountable to the water craft;
    a sonar signal processor in electronic communication with the transducer array, the sonar signal processor operative to associate signals with a plurality of transducers in the transducer array to form at least one acoustic beam in a beam direction, wherein the at least one acoustic beam defines a transverse beam width in a transverse direction corresponding to the transverse axis and a longitudinal beam width in a longitudinal direction corresponding to the longitudinal axis; and
    a beam spreading device mounted in a fixed position relative to the transducer array, wherein the beam spreading device includes at least one non-flat beam spreading surface positioned along the beam direction such that, when the at least one acoustic beam is emitted, the at least one acoustic beam impinges upon the at least one non-flat beam spreading surface and causes spreading so as to increase the transverse beam width.

2. The sonar system of claim 1, wherein the transducer array is a linear transducer array.

3. The sonar system of claim 1, further comprising a housing in which the transducer array and the beam spreading device are disposed.

4. The sonar system of claim 1, wherein the non-flat beam spreading surface is convex.

5. The sonar system of claim 1, wherein the non-flat beam spreading surface is concave.

6. The sonar system of claim 1, wherein the beam spreading device is formed of a foam material.

7. The sonar system of claim 1, wherein the beam direction is aimed at an exterior surface of a hull of the water craft such that the at least one acoustic beam reflects off the non-flat beam spreading surface away from the exterior surface of the hull of the water craft.

8. The sonar system of claim 1, wherein the signals associated with the plurality of transducers are phase-shifted signals.

9. The sonar system of claim 8, wherein varying the frequency of the signals associated with the plurality of transducers permits steering of the at least one acoustic beam.

10. A method of using an underwater sonar system, the method comprising:
    providing a transducer array, the transducer array having a transverse axis and a longitudinal axis disposed perpendicularly to the transverse axis;
    associating signals with a plurality of transducers in the transducer array so as to form a first acoustic beam, wherein the first acoustic beam propagates in a beam first direction and has a first beam width in a first transverse plane, wherein the first transverse plane extends along the beam first direction and contains the transverse axis of the transducer array; and
    disposing a beam spreading device having a curved surface in a fixed position relative to the transducer array such that the first acoustic beam impinges on the curved surface;
    wherein, following impingement on the curved surface, the first acoustic beam propagates in a beam second direction and has a second beam width in a second transverse plane, wherein the second transverse plane extends along the beam second direction and is parallel with the transverse axis of the transducer array;
    wherein the second beam width is greater than the first beam width.

11. The method of claim 10, further comprising receiving, at a sonar signal processor, signals from the transducer array that result from a received acoustic beam.

12. The method of claim 11, further comprising generating, at the sonar signal processor, sonar image data based on the received signals, wherein the sonar image data, when presented on a display, forms a sonar image representing an underwater environment.

13. A sonar system for a water craft, the sonar system comprising:
    a transducer array, the transducer array having a transverse axis and a longitudinal axis disposed perpendicularly to the transverse axis;

a sonar signal processor in electronic communication with the transducer array, the sonar signal processor operative to associate signals with a plurality of transducers in the transducer array so as to form a first acoustic beam, wherein the first acoustic beam propagates in a beam first direction and has a first beam width in a first transverse plane, wherein the first transverse plane extends along the beam first direction and contains the transverse axis of the transducer array; and a beam spreading device having a curved surface, wherein the beam spreading device is positioned relative to the transducer array such that the first acoustic beam impinges on the curved surface;

wherein the curved surface is shaped and oriented such that, following impingement on the curved surface, the first acoustic beam propagates in a beam second direction and has a second beam width in a second transverse plane, wherein the second transverse plane extends along the beam second direction and is parallel with the transverse axis of the transducer array, wherein the second beam width is greater than the first beam width.

14. The sonar system of claim 13, wherein the curved surface defines a cross-section that is convex with respect to the transducer array.

15. The sonar system of claim 13, wherein the second beam width is greater than about twenty-eight (28) degrees in the second transverse plane.

16. The sonar system of claim 13, wherein the curved surface reflects the first acoustic beam.

17. The sonar system of claim 13, wherein the beam spreading device refracts the first acoustic beam.

18. The sonar system of claim 13, wherein the transducer array is a frequency-steered array.

19. The sonar system of claim 13, wherein the curved surface has a radius of curvature, and wherein the radius of curvature lies on a plane that is parallel with the transverse axis.

20. The sonar system of claim 13, wherein the beam second direction is different than the beam first direction.

* * * * *